W. S. DOLL.
CORE FOR MANUFACTURING PNEUMATIC TIRE SHOES.
APPLICATION FILED JULY 25, 1910.
983,354.
Patented Feb. 7, 1911.
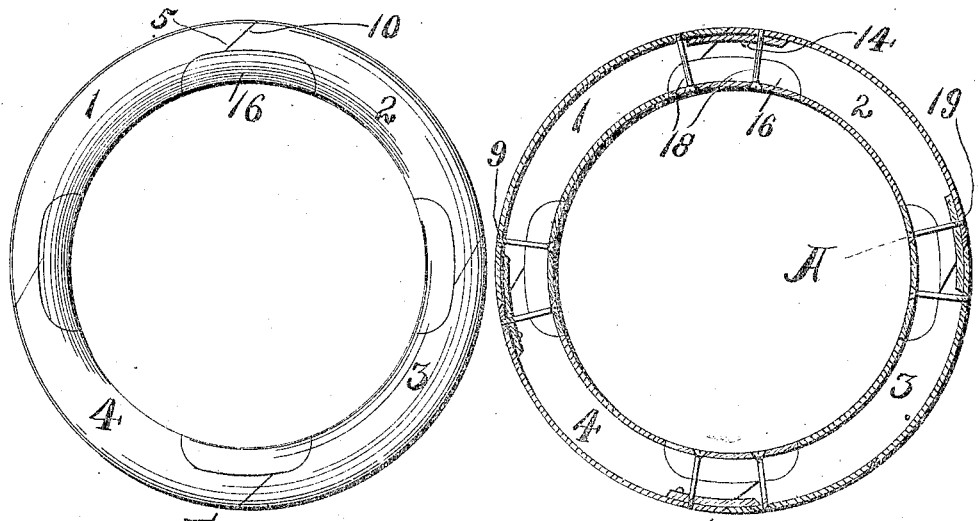
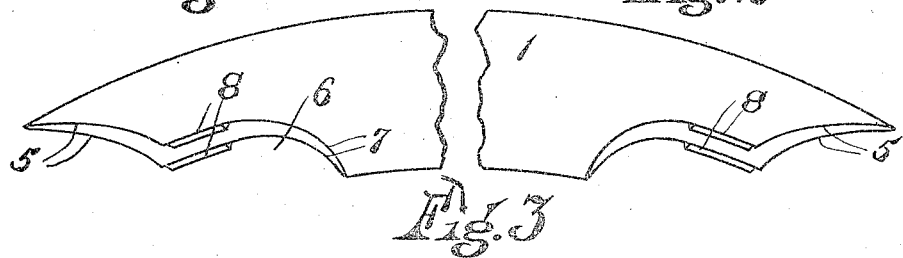
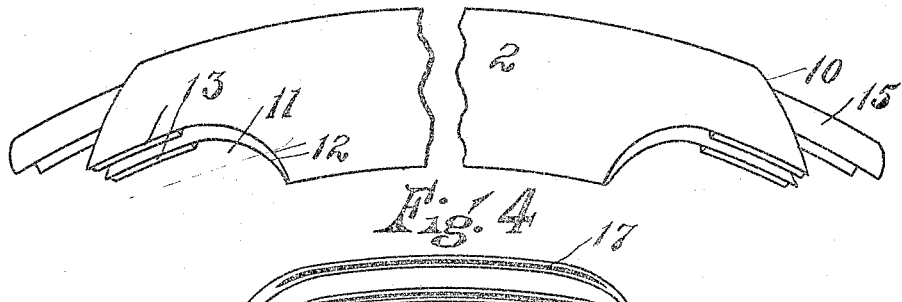
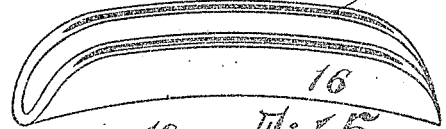
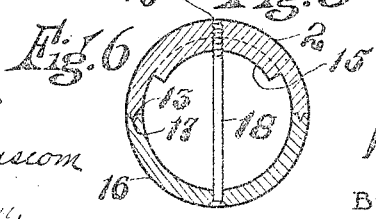
Witnesses:
Austin B. Hanscom
Kathryn Leatherman
INVENTOR-
William S. Doll,
By C. E. Humphrey
ATTORNEY.

UNITED STATES PATENT OFFICE.

WILLIAM S. DOLL, OF AKRON, OHIO.

CORE FOR MANUFACTURING PNEUMATIC-TIRE SHOES.

983,354.   Specification of Letters Patent.   Patented Feb. 7, 1911.

Application filed July 25, 1910. Serial No. 573,665.

*To all whom it may concern:*

Be it known that I, WILLIAM S. DOLL, a citizen of the United States, residing at Akron, in the county of Summit and State of Ohio, have invented new and useful Improvements in Cores for Manufacturing Pneumatic-Tire Shoes, of which the following is a specification.

This invention relates to collapsible cores for use in manufacturing tire-shoes for double-tube pneumatic tires and the object thereof is to provide a collapsible core arranged to be inserted in a tire-shoe for maintaining the same in annular formation during the vulcanization thereof.

Tire-shoes are usually constructed either by completely curing the shoe at one vulcanization or by first giving the carcass a semi-cure, after which the tread is applied and caused to adhere to the carcass by means of a second vulcanization, during which latter operation it has heretofore been customary to insert within the partially-cured carcass an inflatable air bag for maintaining the same in proper shape during the second cure, which secures the tread to the carcass.

This invention more particularly resides therefore in the manufacture of cores to be used with the second described process to displace the use of the inflatable air bag for holding the tire-carcass in shape during the second cure.

This invention contemplates constructing a core of a plurality of segment-shaped members arranged to be temporarily held together and which can be disconnected from each other for the removal of individual segments through the open inner portion of the tire-shoe after the vulcanization thereof.

It also contemplates a peculiar and novel construction of the segments and the means whereby they are temporarily united together to cause them to assume an annular formation.

With the foregoing and other objects in view, the invention consists in the novel construction, combination and arrangement of parts constituting the invention to be hereinafter specifically described and illustrated in the accompanying drawings which form a part hereof wherein is shown the preferred embodiment of the invention, but it is to be understood that changes, variations and modifications can be resorted to which come within the scope of the claims hereunto appended.

In the drawings in which similar reference numerals indicate like parts in the different figures: Figure 1 is a view in side elevation of a core embodying this invention. Fig. 2 is a longitudinal, central, sectional view of the core shown in Fig. 1. Fig. 3 is a perspective view of one of the segment-shaped members of the core. Fig. 4 is a similar view of a complementary core member. Fig. 5 is a perspective view of a coupling member for uniting contiguous segment-shaped members; and, Fig. 6 is a transverse sectional view of the core shown in Fig. 1 on line A of Fig. 2.

A core constructed in accordance with this invention, will, when assembled, constitute an annulus, preferably cylindrical in cross-section and is preferably composed of four segment-shaped members, designated in the drawings by the reference numerals 1, 2, 3 and 4. The segment-shaped members 1 and 3 are identical, and the members 2 and 4 are also similar to each other in all respects, so that a description of the segment-shaped members 1 and 2 with the means for coupling them together, will, it is believed, clearly point out the essential and novel features of this invention, and hereinafter the description will be confined as closely as possible to these two members. The segment-shaped member 1 (shown enlarged in Fig. 3) is tubular, as are all the segments of this core, and cylindrical in cross-section and preferably constructed of drawn tubing, with each end 5 of the segment inwardly-inclined toward each other and terminating at approximately the medial line of said segment, below which are notches 6 with the ends thereof at 7 formed upon curvilinear lines and extending to the inner face of the segment 1. The sides of the notches 6 are provided with circumferentially-extending and inwardly-projecting ribs 8 formed integral with the tubing, if desired, and for a purpose to be later described. The ends of the segment-shaped members 1 and 3 are provided with threaded openings 9 for a purpose to be later described.

The segment-shaped member 2, as well as the member 4, consists of a segment-shaped piece of tubing with the ends 10 thereof inwardly-divergent, the inclination extending to the transverse central line of the member 2, below which the side walls of the segment-shaped members are provided with notches 11 with the ends thereof at 12 cur-

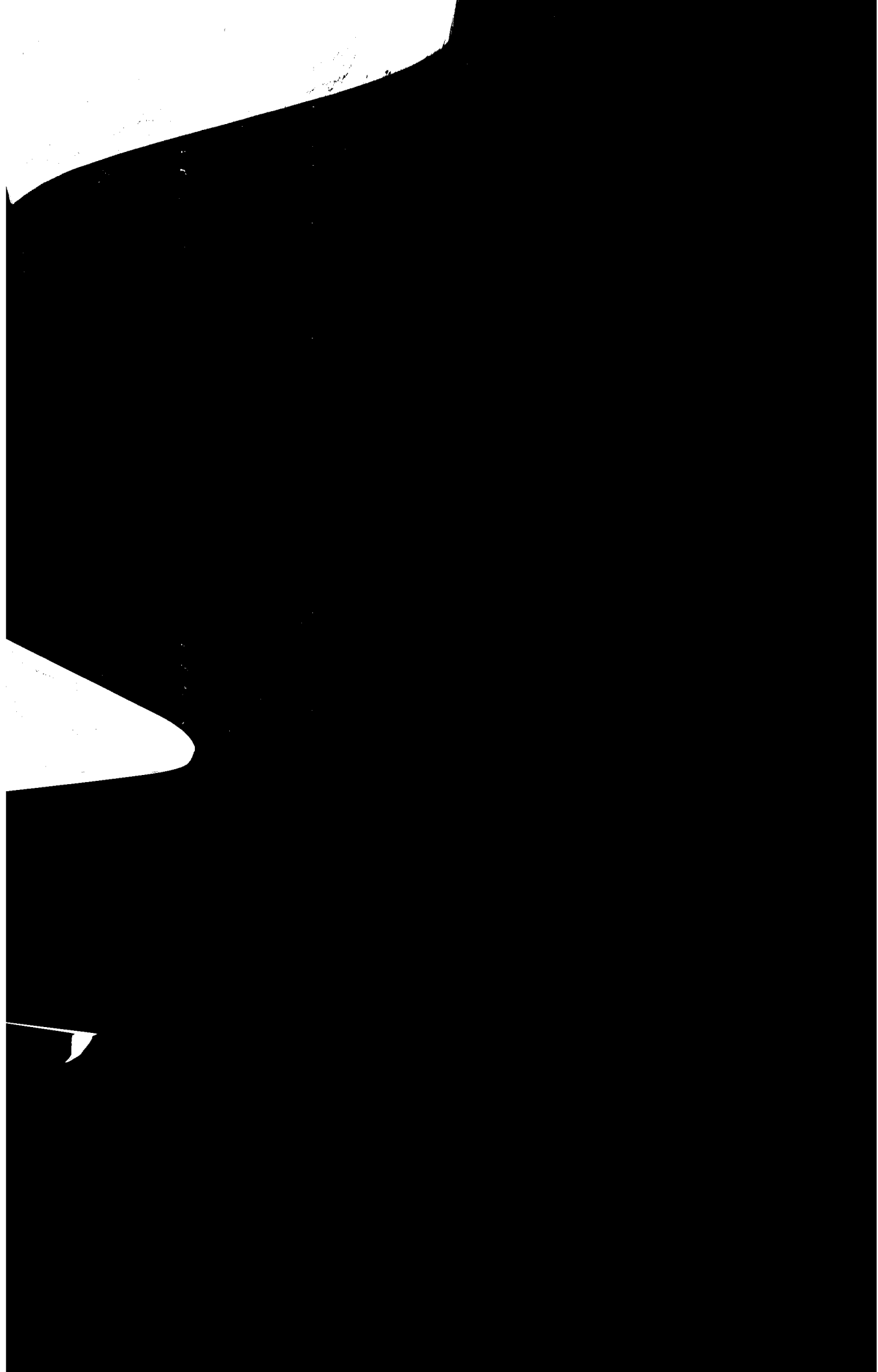

tiguous members, the inner faces of abutting members provided with registering notches to form recesses, coupling members suitably-shaped to be seated in said recesses and constituting closure means therefor, the edges of said segment-shaped members surrounding said recesses and the edges of said coupling members provided with interlocking means for preventing displacement of the latter and means extending through said coupling members and engaging in the abutting ends of said segment-shaped members for temporarily holding said segment-shaped members in annular formation.

4. A device of the class described comprising a plurality of segment-shaped members disconnected from and adapted to abut endwise against each other to form a collapsible ring-core, the ends of all of said segment-shaped members arranged at angles oblique to the axis of said ring-core and the ends of a portion of said segment-shaped members provided with longitudinally-projecting portions adapted to overlap the complementary ends of contiguous members, the inner faces of abutting members provided with registering notches to form recesses, coupling members suitably-shaped to be seated in said recesses and constituting closure means therefor, and means extending through said coupling members and engaging in the abutting ends of said segment-shaped members for temporarily holding said coupling members in position and uniting said segment-shaped members in annular formation.

5. A device of the class described comprising a plurality of segment-shaped members disconnected from each other to form when united a collapsible ring-core, the ends of a portion of said segment-shaped members inwardly-inclined toward each other, the ends of the other members of said core inwardly and divergently-inclined and arranged to abut against the ends of the first-mentioned members, a portion of said members provided with fixed lapping members arranged when said core is assembled to lap the inner faces of the complementary portions of the companion members, the ends of contiguous members provided with notches on their inner faces to form longitudinally-extending recesses, coupling members having the outer faces thereof shaped to conform to the inner portions of said segment-shaped members and each adapted to be fitted into one of said recesses, and holding devices extending through said coupling members into suitable openings in the abutting ends of contiguous segment-shaped members for holding said coupling members in position and said segment-shaped members temporarily in annular formation.

In testimony whereof I have hereunto set my hand in presence of two subscribing witnesses.

WILLIAM S. DOLL.

Witnesses:
C. E. HUMPHREY,
GLENARA FOX.